United States Patent Office 2,768,037
Patented Oct. 23, 1956

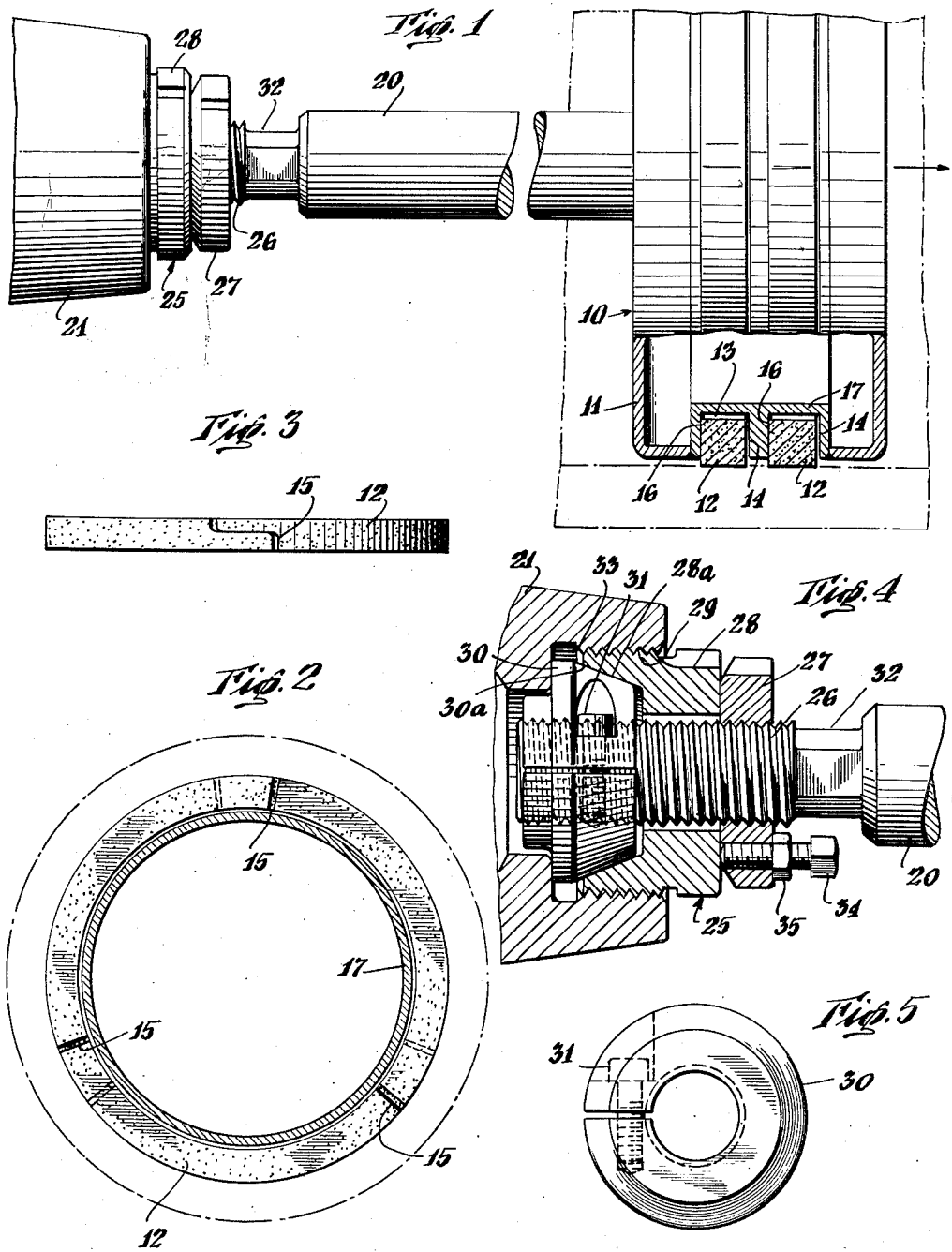

2,768,037
NON-LUBRICATED PISTON

William H. Payne, Olean, N. Y., assignor to Dresser Operations, Inc., Olean, N. Y., a corporation of California Application July 25, 1952, Serial No. 300,841

8 Claims. (Cl. 309—23)

This invention relates to pistons for compressors and a primary object of the invention is to provide a non-lubricated piston with carbon rings for an efficient gas seal during compression of oxygen, hydrogen and other gases which either are destructive of lubricants or are contaminated or adversely affected by lubricants.

Another object of this invention is the provision of a piston structure wherein the carbon rings are readily inserted and removed.

It is a further object to overcome the disadvantages inherent in the prior art structures, e. g., the expansion rings in U. S. Patent 2,105,950.

More specifically, the present invention involves the use of segmented carbon rings loosely positioned in external grooves on the piston, each carbon ring being dimensioned smaller than the groove or slot in which it is placed so as to leave a small lateral clearance between the carbon ring and a side wall of the slot as well as a small free space between the carbon ring and the bottom of the slot. Two, three or four segments are usually employed to form a ring, three segments being preferred. For horizontally moving pistons, the present invention makes it possible to place one segment of each ring around the lowermost portion of the piston and periodically to turn the entire piston through an angle corresponding to that of a ring segment so as to maintain equal wear on all the ring segments throughout the 360° circumference of the piston.

In the accompanying drawings which form a part of the specification and show for exemplification a preferred form of this invention:

Figure 1 is a side view, partly broken away, of a piston;

Figure 2 shows a plan view of one of the rings of the piston of Figure 1;

Figure 3 is an elevation of the piston ring of Figure 2;

Figure 4 is an enlarged view of the crosshead end of the piston rod of Figure 1, partly broken away to show the members which form the device for locking the piston rod to the crosshead; and Figure 5 shows the split retaining nut which is part of the locking device of Figure 4.

Figure 1 shows a piston 10 and a carbon ring 12 in each circumferential groove 13 on the piston. As shown in Figures 2 and 3, each carbon ring 12 is made up of three circular segments (120°) which meet at lap joints 15. The three carbon ring segments are individually and loosely positioned in each groove 13 to form ring 12. Each groove 13 is wider than ring 12 by a small but definite side clearance and a radial clearance at least about 3 times as large is also provided between ring 12 and the base 17 of groove 13. Usually, the radial clearance is not more than 30 times the side clearance.

During the operation of the piston, the carbon rings act both as wearing blocks or shoes and as sealing rings. When the compressor is started up from rest, during the compression stroke, the gas pressure builds up between the cylinder head and piston head 11 and the venturi or suction effect of the gas as it attempts to rush through the restricted annulus between the cylinder wall and the piston rings 12 lifts the light carbon rings 12 out of grooves 13 and into close contact with the cylinder wall. The pressure build-up between the cylinder head and piston head 11 forces carbon rings 12 against sides 16 of grooves 13, permitting high pressure gas to pass between the rings 12 and the sides 14 of grooves 13 into the radial spaces behind the rings 12. The gas pressure thus holds the rings 12 outwardly and tightly against the cylinder wall thereby providing the desired gas-tight seal. After the piston has reached the end of its compression stroke and has begun its return movement, the small amount of high pressure gas in the clearance spaces is quickly dissipated and the rings are no longer tightly forced against the cylinder wall. The dynamics of the piston prevents rings 12 from retracting into grooves 13 even though there is substantially no pressure in the radial clearance behind each ring. Thus, the rings are drawn out from the grooves only once during any continuous operating period. It is an advantage of the present invention that the sealing pressure is the greatest just when the gas pressure is the greatest and the danger of loss through leakage is the greatest.

The clearance dimensions are proportioned to the ring width to provide a volume of gas behind the ring which will exert the pressure required to push the ring segments outwardly against the cylinder walls without substantially leaking out past the piston. Generally, the side clearance is made about 0.003 to 0.007 times the piston ring width and the radial clearance is preferably about 3 to 6 times the side clearance when the ring serves the dual purpose of piston-supporting shoe and sealing ring. When the piston is provided with separate shoes, the side clearance is still about 0.003 to 0.007 times the ring width but the radial clearance is preferably about 12 to 25 times the side clearance.

Further advantages of the present invention are that the side clearance permits the ring segments to be easily slipped into place and that the segments may serve both as sealing rings and as shoes or wearing blocks. As a specific illustration of this dual function of the ring segments, a compressor has a piston 17.75 inches in diameter and two rings projecting about ⅛ inch beyond the cylindrical surface of the piston. Each ring consists of three equal carbon segments 1¼ inches wide by 1⅛ inches deep. The rings fit loosely in grooves on the piston with side clearances of 0.005 inch and with radial clearances of 0.025 inch. The ends of the adjoining segments overlap about ¾ inch.

However, the ring segments may serve only as sealing rings if the piston is provided with separate wearing blocks or the piston is floated in the cylinder on a tail-rod supported by a lubricated slipper or bushing external of the cylinder bore or the piston is made of carbon. Carbon pistons may be made of grade S-52 carbon sold by Pure Carbon Company. As another specific illustration, a compressor which compresses hydrogen to a gauge pressure of 850 lbs. per sq. in. has a cast iron piston of 6½ inches in diameter that is supported fore and aft by carbon wearing shoes. The piston is provided with four grooves and sealing carbon rings, axially spaced between the fore and aft carbon shoes. Each carbon ring is made up of three equal ring segments and is ¾ inch wide. Each carbon ring has a side clearance of 0.005 inch and a radial clearance of 0.125 inch. Other compressors with the non-lubricated rings of this invention are generally built in piston sizes ranging from about 5 to 25 inches in diameter.

The carbon rings may be made of any commercially available hard carbon, e. g., grade P-792 carbon sold by Pure Carbon Company.

The non-lubricated piston rings of this invention are of very simple construction and, therefore, relatively inexpensive. Since mechanical springs or like elements are not used to press the rings in sealing contact with the cylinder walls, the rings are not in pressing contact with the cylinder walls during the return strokes of the piston so that wearing of the rings is limited essentially to one-half of the operating time of the compressor, i. e., during the compression strokes. Furthermore, when springs are used to hold the carbon rings in sealing contact with the cylinder walls, there is always present the danger that a ring will break or disintegrate during operation of the compressor and thus permit the spring originally behind the ring to contact and score the cylinder walls. In such event, the necessary repairs are time-consuming and costly. Mechanical expander springs are also detrimental to the ring grooves in a solid carbon piston even during normal operation and should a ring disintegrate from any cause, its spring may completely destroy the carbon piston. It is noteworthy that the non-lubricated pistons of this invention function successfully in high-speed, high-pressure compressors; for instance, the pistons may travel at speeds of the order of 600 to 1000 feet per minute and develop gauge pressures ranging up to 1000 lbs. per sq. in. and higher.

To effectuate even wear of all the ring segments pursuant to this invention, the piston is periodically turned about its axis, usually through an angle corresponding to the angle of the equal segments which form the piston rings. Thus, if each ring is made of three segments, it is advisable to turn the piston periodically 120° about its axis so that after each turning another ring segment is disposed opposite the lowermost portion of the cylinder on which the piston rides in sliding contact. Means particularly well suited for turning the piston are shown in Figures 4 and 5.

Piston 10 is connected by piston rod 20 to crosshead 21. The end of rod 20 which joins crosshead 21 is provided with an adjustable locking device 25 comprising the following parts. The end of rod 20 has a screw thread 26 which matches the inner thread of locking nut 27. A nut 28 slides over screw thread 26 but has a screw thread 29 on its outer surface. A split retaining nut 30 with an inner screw thread matching thread 26 on rod 20 is screwed on the end of rod 20 and locked in position by tightening cap screw 31. After piston 10 has been turned about its axis to the desired position with the aid of a wrench gripping wrench flats 32 on rod 20, nut 28 is screwed into the threaded recess 33 of crosshead 21, the tapered faces 28a and 30a of nut 28 and split nut 30, respectively, serving to center piston rod 20 and lock it in place. Locking nut 27 is screwed tightly against nut 28 and then secured in place by screwing in set screw 34 and jam nut 35.

After piston 10 has been in operation for a sufficient period to show some wear of the ring segment at the bottom of piston 10, locking device 25 is loosened in the following manner to permit turning of piston 10 so that another ring segment is placed at the bottom of piston 10. Jam nut 35 and set screw 34 are in turn loosened and locking nut 27 is screwed away from nut 28 toward wrench flats 32. Nut 28 is screwed out of crosshead 21 a few turns so as to relieve the binding pressure between tapered faces 28a and 30a of nut 28 and split nut 30, respectively, as well as between split nut 30 and crosshead 21. A wrench gripping wrench flats 32 will then readily facilitate the turning of rod 20 and piston 10 through any desired arc. Piston 10 is again held in its new position by tightening locking device 25 as aforesaid. It is evident that locking device 25 is simple in construction and easy to manipulate. Furthermore, when the position of split nut 30 has been set on the end of rod 20 to give a desired end clearance between the piston and cylinder heads, the loosening of locking nut 27 and nut 28 to permit the turning of piston 10 will in no way disturb the setting of the end clearance.

In view of the various modifications of the invention which will occur to those skilled in the art upon consideration of the foregoing disclosure without departing from the spirit or scope thereof, only such limitations should be imposed as are indicated by the appended claims.

What is claimed is:

1. A non-lubricated piston comprising a piston having a plurality of circumferential grooves therein and a segmented carbon ring in each of said grooves, there being a substantially unobstructed lateral clearance between each said ring and the side of its respective groove and a substantially unobstructed radial clearance between each said ring and the base of its respective groove at least about 3 times said lateral clearance.

2. The piston of claim 1 wherein the lateral clearance is in the range of about 0.003 to 0.007 times the carbon ring width and the radial clearance is in the range of about 3 to 30 times said lateral clearance.

3. In a non-lubricated piston, the improvement of a ring which serves as sealing ring and wearing shoe, which comprises a ring formed of a plurality of ring segments of equal size and disposed loosely in a circumferential groove on said piston, said groove being dimensioned to leave a lateral clearance between a side wall of said groove and a side wall of said ring equal to about 0.003 to 0.007 times the width of said ring and a substantially unobstructed radial clearance between said ring and the base of said groove equal to about 3 to 6 times said lateral clearance.

4. The piston of claim 3 wherein each ring segment has ends adapted to overlap the ends of adjoining ring segments.

5. The piston of claim 3 wherein the piston is driven by a rod joined to a crosshead by an adjustable locking device adapted to be readily loosened to permit rotation of said piston about its axis through an arc at least equal to that of one said ring segment.

6. In a non-lubricated piston provided with a wearing shoe, the improvement of a sealing ring formed of a plurality of ring segments of equal size and disposed loosely in a circumferential groove on said piston, said groove being dimensioned to leave a lateral clearance between a side wall of said groove and a side wall of said ring equal to about 0.003 to 0.007 times the width of said ring and a substantially unobstructed radial clearance between said ring and the base of said groove equal to about 12 to 25 times said lateral clearance.

7. The piston of claim 6 wherein each ring segment has ends adapted to overlap the ends of adjoining ring segments.

8. The piston of claim 6 wherein the piston is driven by a rod joined to a crosshead by an adjustable locking device adapted to be readily loosened to permit rotation of said piston about its axis through an arc at least equal to that of one said ring segment.

References Cited in the file of this patent

UNITED STATES PATENTS

| | | |
|---|---|---|
| 2,092,086 | Saharoff | Sept. 7, 1937 |
| 2,092,087 | Saharoff | Sept. 7, 1937 |
| 2,337,057 | McAndrews | Dec. 21, 1943 |
| 2,456,529 | Naab | Dec. 14, 1948 |
| 2,510,377 | Carr | June 6, 1950 |

OTHER REFERENCES

"Power," page 119, July 1952, vol. 96, No. 7.